US012483408B2

(12) United States Patent
Tanski et al.

(10) Patent No.: US 12,483,408 B2
(45) Date of Patent: Nov. 25, 2025

(54) ANONYMOUS NON-FUNGIBLE TOKEN TRANSFER USING PRIVATE BLOCKCHAIN

(71) Applicant: Capital One Services, LLC, McLean, VA (US)

(72) Inventors: Peter Tanski, Marlborough, MA (US); Austin Erickson, Herndon, VA (US); Christopher Wu, Ashburn, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 217 days.

(21) Appl. No.: 18/372,508

(22) Filed: Sep. 25, 2023

(65) Prior Publication Data

US 2025/0106024 A1 Mar. 27, 2025

(51) Int. Cl.
*H04L 9/32* (2006.01)
*H04L 9/00* (2022.01)

(52) U.S. Cl.
CPC .......... *H04L 9/3213* (2013.01); *H04L 9/3236* (2013.01); *H04L 9/50* (2022.05)

(58) Field of Classification Search
CPC ....... H04L 9/3213; H04L 9/3236; H04L 9/50; H04L 2209/56; H04L 9/3218; H04L 9/3239
See application file for complete search history.

(56) References Cited

U.S. PATENT DOCUMENTS

| | | | |
|---|---|---|---|
| 11,870,905 B1* | 1/2024 | Park | H04L 9/40 |
| 2020/0059364 A1* | 2/2020 | Konda | H04L 63/123 |
| 2021/0150626 A1* | 5/2021 | Robotham | H04L 63/0442 |
| 2022/0020018 A1* | 1/2022 | Jivanyan | G06Q 20/3829 |
| 2022/0270725 A1* | 8/2022 | DeRosa-Grund | G06F 16/2365 |
| 2023/0118380 A1* | 4/2023 | Krosinski | G06Q 20/405 705/44 |

(Continued)

OTHER PUBLICATIONS

Sep. 13, 2022, "Is Zero Knowledge Technology the Future of NFTs?", Mina Foundation, 5 pages.

(Continued)

*Primary Examiner* — Lynn D Feild
*Assistant Examiner* — Vladimir I Gavrilenko
(74) *Attorney, Agent, or Firm* — Banner & Witcoff, Ltd.

(57) ABSTRACT

Methods, systems, and apparatuses are described herein for protecting the privacy of parties conducting Non-Fungible Token (NFT) transfers by conducting separate NFT transactions on a private blockchain separate from a public blockchain. An issuer and recipient may generate a token secret, and the issuer may send a create token transaction request comprising a unique token identifier, the token secret, and zero-knowledge proof data. Based on that request, an NFT may be minted on a private blockchain. A recipient may request the token by providing the unique token identifier and a zero-knowledge proof generated, by the recipient, based on the token secret. Based on comparing the zero-knowledge proof and the zero-knowledge proof data, the NFT may be sent to the recipient. A hash corresponding to a recipient address and the unique token identifier may be stored in a public blockchain.

19 Claims, 3 Drawing Sheets

(56) References Cited

U.S. PATENT DOCUMENTS

2024/0086503 A1* 3/2024 Chodroff ................ G06Q 50/40
2024/0185191 A1* 6/2024 Bernardi .................. H04L 9/50

OTHER PUBLICATIONS

Jul. 15, 2022, Overview of Zero-Knowledge Blockchain Projects, Chainlink, 6 pages.
Sep. 8, 2023, "Zero-Knowledge Rollups," last edited by @jmcook1186, 21 pages.
Wikipedia page, Tornado Cash, retrieved from <<https://en.wikipedia.org/w/index.php?title=Tornado_Cash&oldid=1174945720, date of publication unknown but, prior to Dec. 13, 2022, 4 pages.

* cited by examiner

ANONYMOUS NON-FUNGIBLE TOKEN TRANSFER USING PRIVATE BLOCKCHAIN

FIELD OF USE

Aspects of the disclosure relate generally to transfer of non-fungible tokens (NFTs). More specifically, aspects of the disclosure may provide for the protection of parties conducting NFT transfers by conducting separate NFT transactions on a private blockchain separate from a public blockchain.

BACKGROUND

Though blockchain technology can provide some amount of privacy for users, practically speaking, many blockchain networks do not provide absolute privacy. For example, analysis of transactions conducted with respect to a certain wallet address can, when appropriately correlated with outside data, reveal the identity of one or more parties associated with the wallet address. In fact, the permanent, indelible, and unalterable nature of blockchains can make privacy quite difficult to achieve: while conventional (e.g., fiat currency) transactions can be conducted without documentation and/or disclosure, blockchain transactions are comparatively quite public.

This lack of privacy problem poses a particular problem for entities seeking to award NFTs. Assume, for example, that a company wishes to reward all of its customers a unique NFT. In such a circumstance, the transactions associated with such awards, when appropriately recorded on the blockchain, could be analyzed to reveal a list of wallet addresses associated with customers of the company. In turn, when correlated with external data, these addresses could be further analyzed to reveal a list of customers of the company. Such a result would be undesirable for both the company and its customers, who might prefer a relatively greater degree of privacy. For example, if a company were to inadvertently reveal the wallet addresses of all of its customers, then those customers might be at an increased risk of threat from malicious actors, such as those who wish to use those wallet addresses to conduct spear phishing attacks. As another example, if a company were to inadvertently reveal the wallet addresses of all of its customers, then the company's competitors could use that information for competitive intelligence.

Conventional privacy approaches for digital assets are often insufficient, as such approaches are vulnerable to compromise and/or make it prohibitively difficult for recipients of digital assets to prove that they are entitled to those digital assets. For example, while the Loopring protocol provides an audited and non-custodial approach to digital asset exchange and payment, Loopring does not provide a system that can securely and verifiably distribute a reward or benefit to an individual only once while also being adopted with minimal onboarding and while hiding the scope of real person participation from malicious parties. As a result, companies (e.g., marketing companies) can be hesitant to provide digital asset rewards to customers because doing so often requires substantial onboarding of both company employees and customers, because doing so could inadvertently compromise customers' identities, because doing so often requires that customers reveal their own personal information (e.g., wallet addresses) to the company in an undesirable manner, and because custom solutions to such digital assets can undesirably limit customers' ability to redeem and enjoy those digital assets.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein use a private blockchain to perform NFT transfers in a manner which protects the privacy of parties involved in the NFT transfer. A issuer may wish to issue an NFT to a recipient. The issuer and the recipient may generate a token secret such that a first portion of the token secret is encrypted by the issuer and a second portion of the token secret is encrypted by the recipient. For example, a first portion of the token secret may be encrypted by a first public key associated with the recipient, and a second portion of the token secret may be encrypted by a second public key associated with the issuer. The issuer may also generate a unique token identifier. The issuer may send, to a computing device and as part of a create token transaction request, the unique token identifier, the token secret, and zero-knowledge proof data. The computing device may, in response to that create token transaction request, generate an NFT on a private blockchain separate from the public blockchain. The computing device may later receive, from the recipient, a token request. That token request may comprise the unique token identifier and a zero-knowledge proof that was generated, by the recipient, based on the token secret. The computing device may, in response to that token request, send the NFT to the recipient based on a comparison of the zero-knowledge proof to the zero-knowledge proof data. The computing device may further store, in the public blockchain, data corresponding to a plurality of NFT transactions. That data may comprise a hash that is based on an address associated with the recipient and the unique token identifier. That data may comprise a Merkle tree, such that at least one hash of the Merkle tree corresponds to the NFT. As part of storing such data, the computing device may submit, to a smart contract on the public blockchain and based on the NFT, a state update.

As will be described in detail below, a variety of additional steps may be taken to even further protect the privacy of parties to an NFT transaction. For example, as part of sending the NFT to the recipient, the computing device may associate the NFT with a new token identifier and send the new token identifier to the recipient. This identifier shuffling process may make it difficult to correlate transactions involving creating an NFT and sending the same NFT. As another example, as part of sending the NFT to the recipient, the computing device may wait until a predetermined time before sending the NFT. As another example, the private blockchain may be configured to not store any records associated with the minting of an NFT, such that an NFT may be stored on the blockchain without information indicating, for example, the identity of the party that requested that the NFT be minted.

The NFT received by the recipient may be generated and originally stored on the private blockchain, but may be later moved to the public blockchain. For example, the computing device may receive, from the recipient, a request to move the NFT to the public blockchain. In response, the computing device may, based on determining that the recipient is entitled to the NFT, transmit data associated with the NFT to the public blockchain.

Corresponding method, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
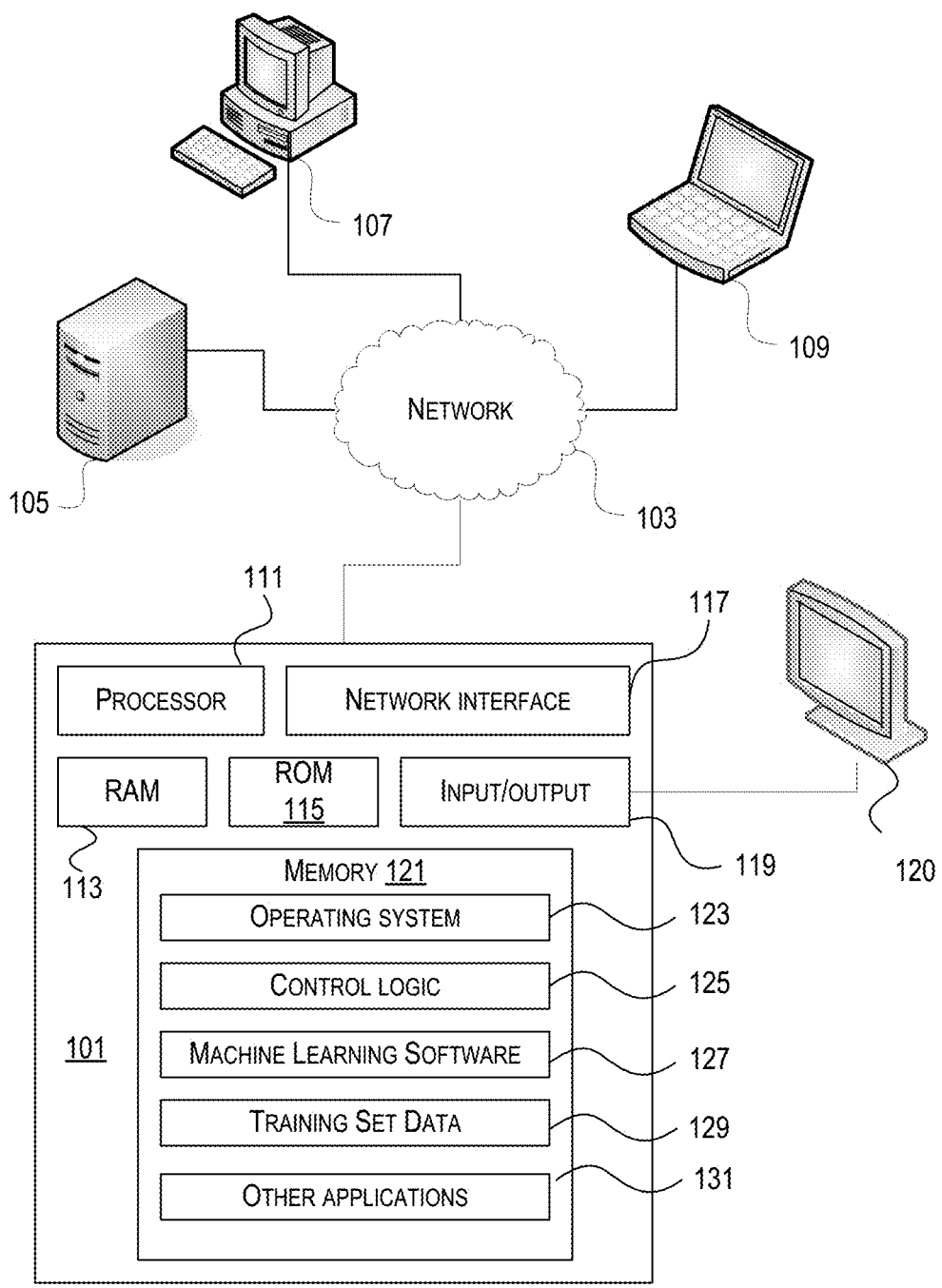
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for privately transferring NFTs. The permanent, indelible, and unalterable nature of blockchains has many advantages, but can also undesirably reveal the identity of participants in certain transactions. For example, if a company wished to provide all of its customers an NFT coupon, then the transactions involved in the minting and providing of those NFT coupons could reveal the wallet addresses of the company's customers. To prevent such an outcome, aspects described herein use a private blockchain, separate from a public blockchain, to mint and provide access to NFTs. For example, an issuer might mint an NFT on a private blockchain in a manner that can be retrieved by the recipient without creating a transaction on a public blockchain that directly correlates the minting of the NFT and the retrieval of the NFT. Such activity on a private blockchain might nonetheless be reflected on the public blockchain (e.g., through a smart contract, a Merkle tree, or the like) and/or might be moved to the public blockchain, such that the recipient of the NFT might use the NFT as desired.

As an example of how the present disclosure may operate, an issuer (e.g., a marketing company) might wish to send all of its customers an NFT coupon. The issuer may, together with the intended recipient(s), generate one or more token secrets. Half of each token secret may be encrypted by the issuer, and half of the token secret may be encrypted by the recipient. The issuer may also generate a unique token identifier. The issuer and sender may additionally and/or alternatively work together to generate zero-knowledge proof data. In this manner, the issuer and recipient generate data which may be used by each party to generate zero-knowledge proofs of the possession of the token secret. The issuer might then send, to a computing device, a create token transaction request comprising the unique token identifier, the token secret, and zero-knowledge proof data. Based on this create token transaction request, an NFT may be minted on the private blockchain. In some ways, this minting might act like a virtual dead drop, where the NFT is stored on the private blockchain and is not associated with the issuer (e.g., the NFT is not stored in a wallet address associated with the issuer). Later, a recipient may send, to the computing device, a token request that comprises the unique token identifier and a zero-knowledge proof generated, by the recipient, based on the token secret. In this manner, the recipient may prove its entitlement to the NFT corresponding to the token identifier by providing zero-knowledge proof that it possesses the token secret. The computing device may, based on a comparison of the zero-knowledge proof to the zero-knowledge proof data, send the NFT to the recipient. Then, the computing device may take steps to record, in a public blockchain, data which can be used to prove that the recipient is entitled to the NFT. For example, the computing device may further store, in a public blockchain separate from the private blockchain, data (e.g., a Merkle tree) that indicates a plurality of NFT transactions, such that the data comprises a hash based on an address associated with the recipient and the unique token identifier.

The particular approach described herein provides numerous improvements over conventional cryptocurrency anonymity services, such as cryptocurrency tumblers. The process described herein is advantageous for privacy because it ensures that no transaction between an issuer and a recipient exists on a public blockchain: while a zero-knowledge rollup of transactions might be added to the public blockchain in certain circumstances, this does not include the addresses of issuers or recipients. The process described herein is also advantageous because no transaction between an issuer and a recipient exits on a private blockchain. In particular, the mechanism for an issuer and a recipient to generate a shared secret off-chain and for the recipient to redeem a digital asset on the private blockchain breaks any direct correlations between the issuer and the recipient. Moreover, since the transaction where the issuer has minted a digital asset is not needed to verify ownership by a recipient, the digital asset mining transaction may be discarded (e.g., not added to the private and/or public blockchains), breaking any possible correlations between a digital asset transaction identifier and the issue. Indeed, this redemption mechanism allows the digital asset to be owned by the private blockchain itself as an intermediary, such that there is no connection between the issuer and the recipient. Rather, from the perspective of an outside observer, all that can be seen is that the issuer makes a payment to a smart contract (if applicable), and that the recipient comes into ownership of a digital asset from a separate blockchain.

Another improvement described herein is that the privacy process detailed herein prevents possible theft of the digital asset during transfer. As will be described in further detail below, because the issuer and recipient share a token secret, both parties can generate zero-knowledge proofs that they know the token secret. In turn, the recipient cannot (e.g., inadvertently) transfer a digital asset with metadata to another recipient without sharing their portion of the token secret.

Aspects described herein improve the functioning of computers by improving the privacy of the exchange of digital assets. The process of minting and transferring digital assets is a fundamentally computer-implemented process, but—as detailed above—this process may introduce privacy concerns. The processes described herein remediate these and other concerns by structuring computing devices in a manner which permits the transfer of digital assets, such as NFTs, without revealing the identity of the issuer of the digital asset or the recipient of the digital asset. In turn, this improves computer security as a whole, as it prevents malicious actors from analyzing blockchain activity and purporting to identify (and potentially compromise) wallet owners.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
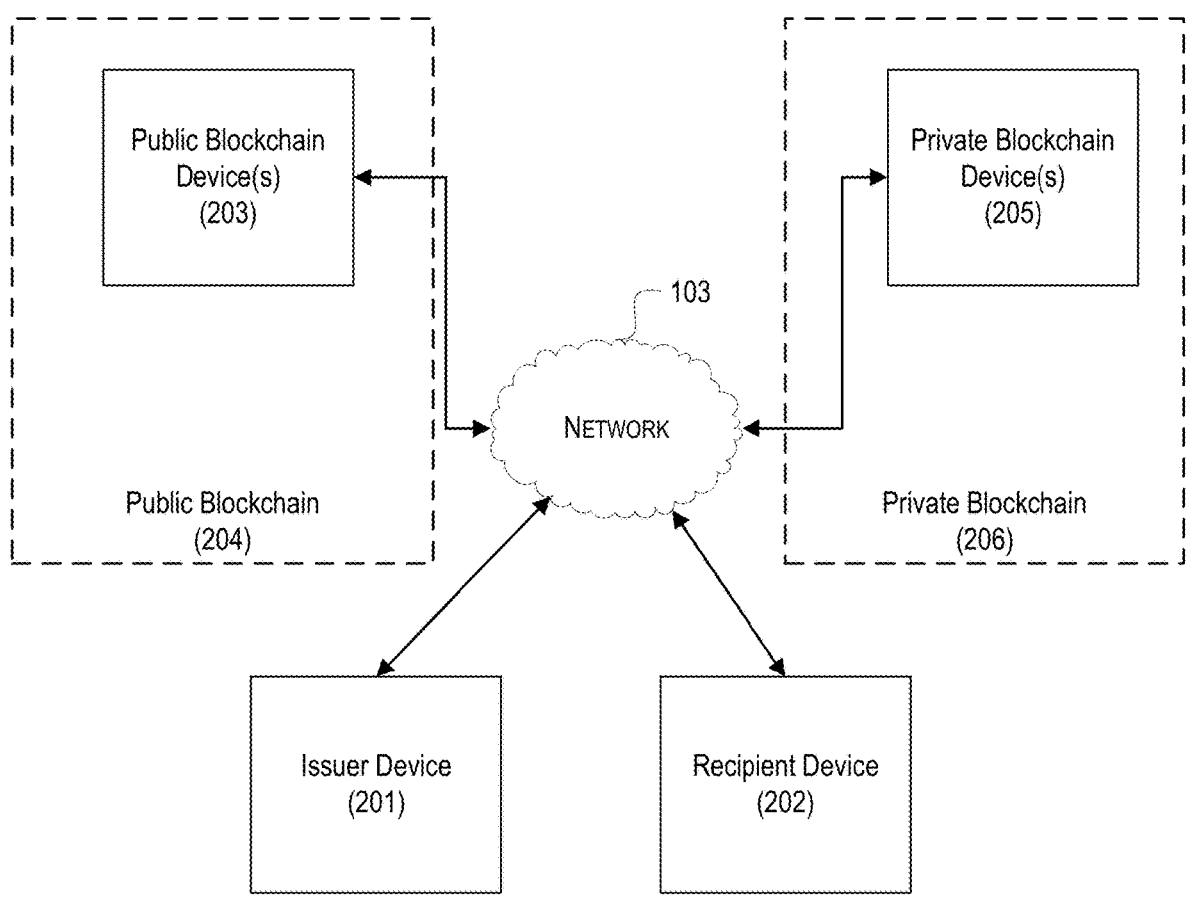
FIG. 2 depicts a system comprising different computing devices that may be used in implementing one or more aspects of the disclosure in accordance with one or more illustrative aspects discussed herein.

FIG. 2 depicts a system comprising an issuer device 201, a recipient device 202, public blockchain devices 203 providing a public blockchain 204, and private blockchain devices 205 providing a private blockchain 206. All such devices are shown as communicatively coupled via the network 103. All of the devices shown in FIG. 2 may comprise all or portions of a computing device, such as any of the computing devices described above with respect to FIG. 1. For example, any of the devices depicted in FIG. 2 may comprise a computing device that comprises one or more processors and memory storing instructions that, when executed by the one or more processors, cause performance of one or more steps. As another example, any of the devices depicted in FIG. 2 may be instructed by one or more non-transitory computer-readable media storing instructions that, when executed by one or more processors, cause the device to perform one or more steps.

The issuer device 201 may be associated with an issuer of a digital asset, such as an NFT. The issuer may comprise any entity (e.g., an individual, a company) that initiates the minting and/or transfer of a digital asset, such as an NFT, to a recipient. The issuer device 201 need not be any particular form of computing device: for example, the issuer device 201 may be a server managed by a large corporation and used to send digital assets to customers, or may be a smartphone used by an individual to send a friend an NFT.

The recipient device 202 may be associated with a recipient of a digital asset, such as an NFT. The recipient may comprise any entity (e.g., an individual, a company) that receives a digital asset. As such, like the issuer device 201, the recipient device 202 need not be any particular form of computing device.

The public blockchain 204 may comprise any blockchain running on any form of blockchain technology, such as the Ethereum network, the Bitcoin network, the Ripple network, or the like. Blockchains such as the public blockchain 204 may comprise one or more nodes, such as the public blockchain devices 203. While FIG. 2 depicts the public blockchain devices 203 as the only nodes in the public blockchain 204 for simplicity, any devices (e.g., the issuer device 201, the recipient device 202, and/or the private blockchain devices 205) may be a node in the public blockchain 204. The public blockchain 204 may comprise one or more smart contracts. For example, the public blockchain 204 may comprise a smart contract that, when updated, comprises information associated with digital assets stored in the private blockchain 206. As another example, the public blockchain 204 may comprise a smart contract that, when executed, permits the transfer of a digital asset from the private blockchain 206 to the public blockchain 204.

The private blockchain 206 may, like the public blockchain, run on any form of blockchain technology. For example, the private blockchain 206 may comprise a Layer 2 Blockchain, such as that described with respect to the Ethereum protocol. That said, the private blockchain may be private in that it may be configured, as described herein, to effectuate the transfer of digital assets in a private manner. In other words, the private blockchain 206 may be configured to effectuate the minting of and transfer of digital assets in a manner that is decentralized and secure. For example, the private blockchain 206 may be maintained by the issuer associated with the issuer device 201, such that the private blockchain 206 might not be usable by other issuers, might not be usable to create cryptocurrency, or the like. As another example, the private blockchain 206 may be maintained by a third party that services a wide variety of issuers, but might not be usable to conduct transactions that do not involve minting or transferring digital assets.

The particular configuration of devices depicted in FIG. 2 is illustrative, and may be rearranged in a variety of ways. For example, as already indicated above, any of the devices depicted in FIG. 2 may be a node in one or more blockchains, including but not limited to the public blockchain 204 and the private blockchain 206. As another example, one or more of the devices depicted in FIG. 2 may be virtualized. For instance, the private blockchain 206 may be effectuated through a virtual machine, such that the private blockchain devices 205 may comprise one or more virtual machines that act as nodes for the private blockchain 206.

Figure 3:
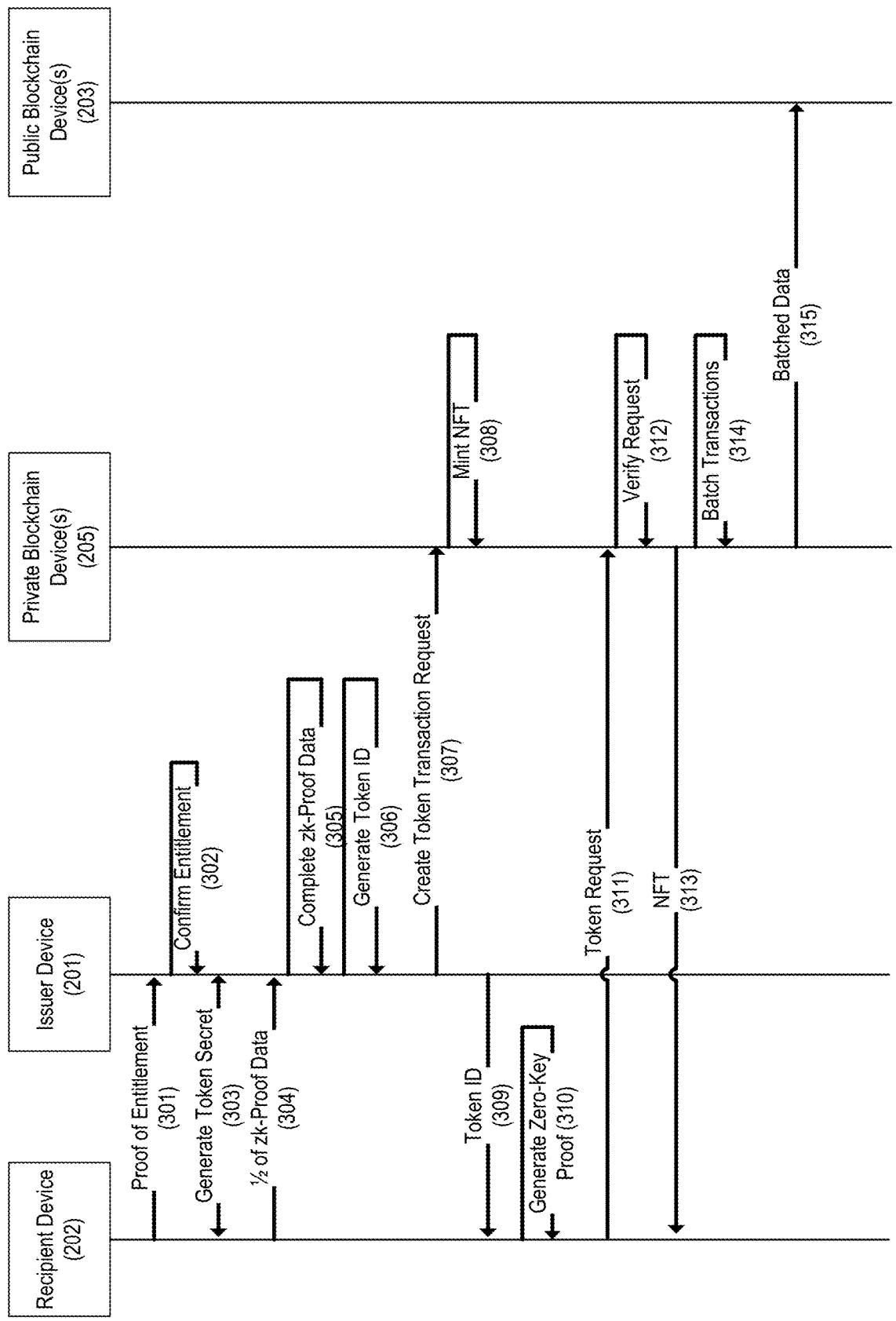
FIG. 3 depicts a flow chart depicting a process for NFT transfer involving a recipient device, an issuer device, a private blockchain, and a public blockchain.

FIG. 3 is a sequence diagram illustrating how the recipient device 202, the issuer device 201, the private blockchain devices 205, and the public blockchain devices 203 may be used to protect the privacy of parties conducting digital asset transfers by conducting separate digital asset transactions on a private blockchain separate from a public blockchain. The particular roles depicted in FIG. 3 are illustrative, and may be re-arranged or otherwise modified as desired. For example, steps shown as being performed by the recipient device 202 may be performed by a plurality of different devices. As another example, steps shown as being performed by the issuer device may be performed by the same device as performing the steps shown as being performed by the private blockchain devices 205.

Step 301 through step 309 detail a process whereby, in response to a recipient being entitled to a digital asset, an issuer device 201 performs steps which ultimately generate a digital asset and store that digital asset on the private blockchain 206. As will be detailed below, this process involves generation of a token secret shared by the recipient device and the issuer device, generation of corresponding zero-knowledge proof data based on that token secret, then a minting of a digital asset that is stored on the private blockchain 206 as associated with the zero-knowledge proof data.

In step 301, the recipient device 202 may send proof of entitlement to the issuer device 201. In this way, the recipient may provide, to the issuer, proof of fulfillment of conditions that entitle the recipient to a digital asset, such as an NFT. The mechanism with which the recipient device 202 transmits this information may vary. For example, the recipient device 202 may execute one or more applications (e.g., a video game) which, upon completion of certain conditions, are configured to transmit entitlement data to the issuer device 201. As another example, a user of the recipient device 202 may, on a web browser executing on the recipient device 202, access a website associated with the issuer and provide data which is transmitted to the issuer device 201. The particular conditions set by the issuer may accordingly vary. For example, in some circumstances, the conditions may comprise membership, by the recipient, in a group (e.g., a group of customers, a membership club). As another example, the conditions may comprise actions taken by a user online or in real life.

In step 302, the issuer device 201 may confirm the recipient's entitlement to a digital asset. The issuer may be responsible for verifying the recipient's identity and entitlement to a digital asset. As indicated above, the conditions set by the issuer may vary. For instance, the issuer device 201 may confirm the recipient's entitlement to a digital asset by checking whether the proof of entitlement transmitted in step 301 satisfy one or more requirements.

In step 303, the issuer device 201 may work with the recipient device 202 to generate a token secret. The token secret may be comprised of two halves that are concatenated together: one half encrypted by the recipient's public key and known only to the recipient, and one half encrypted by the issuer's public key and only known to issuer. For example, a first portion of the token secret may be encrypted by a first public key associated with the recipient, and a second portion of the token secret may be encrypted by a second public key associated with the issuer. Such a combination permits the token secret to pass a zero key validity check if either half is matched, such that either or both the issuer and the recipient may prove knowledge of the token secret. The token secret may be usable to generate zero-knowledge proof data that is usable to verify a zero-key proof that an entity (e.g., the recipient) knows the token secret. To work together in the manner described in step 303, the issuer device 201 and the recipient device 202 may transmit one or more messages. For example, each device may generate a respective portion of the token secret, then the randomly-generated portions may be concatenated together by one of the devices.

One reason why the token secret is generated in the manner described in step 303 is that it ensures that neither party can share the session secret with others. If the issuer generates a secret which is then transferred to the recipient, then the issuer can still (maliciously and/or unintentionally) transmit the secret to another recipient. In contrast, by generating the token secret in the manner described, the token secret is tied to and unique to both the issuer and the recipient in question.

In step 304, the recipient device 202 may send, to the issuer device 201, one half of zero-knowledge proof data, and in step 305, the issuer device 201 may complete the zero-knowledge proof data by, e.g., providing the other half of the zero-knowledge proof data. A zero-knowledge protocol enables a party (e.g., the issuer, the recipient) to prove possession of information (e.g., the token secret) without revealing the information itself. In the context of step 304 and 305, this may comprise generation, by the recipient and issuer, of data that is usable by the private blockchain devices 205 to later confirm that one or more entities comprise either half of the token secret. For example, as part of step 304, the recipient device 202 may send zero-knowledge proof data corresponding to a first portion of the token secret and, as part of step 305, the issuer device 201 may determine zero-knowledge proof data corresponding to a second portion of the token secret. In turn, the combined zero-knowledge proof data may be later used to confirm whether any entity (e.g., the ultimate recipient of a digital asset) has possession of all or portions of the token secret.

In step 306, the issuer device 201 may generate a unique token identifier. The unique token identifier may be generated by the issuer in a variety of ways. In some cases, the unique token identifier may be a random string. In other cases, the unique token identifier may be generated to obfuscate the relationship between a digital asset and one or more digital assets. For example, each digital asset minted on behalf of the issuer device 201 may be generated with a wholly unrelated token identifier (e.g., one comprising a natural language word, another comprising a hash, another comprising a series of numbers) so as to obfuscate the relationship between the digital assets.

In step 307, the issuer device 201 may send, to the private blockchain devices 205, a create token transaction request. In turn, one or more of the private blockchain devices 205 may receive, from an issuer, a create token transaction request that comprises a unique token identifier, a token secret partially encrypted by an issuer and partially encrypted by a recipient, and zero-knowledge proof data. The create token transaction request may comprise the unique token identifier generated in step 306, the token secret generated in step 303, and/or the zero-knowledge proof data determined via step 304 and/or step 305. In this way, the issuer device 201 may request the generation of a digital asset with a particular identifier (e.g., the token identifier generated in step 306), but might also associate the digital asset with secret information (e.g., the token secret and/or the zero-knowledge proof data), such that the digital asset is stored with that secret information. As will be detailed below, this secret information might be used by a recipient to prove their entitlement to the digital asset without direct involvement of the issuer.

In step 308, the private blockchain devices 205 may mint a digital asset, such as an NFT. For example, one or more of the private blockchain devices 205 may generate, based on the create token transaction request and on the private blockchain 206, a digital asset such as an NFT. Minting may comprise generating the digital asset by, for example, creating data corresponding to the digital asset and recording it in the private blockchain 206. The digital asset may be minted such that it stores all or portions of the information provided in the create token transaction request received in step 307. For example, a digital asset may be minted such that the digital asset stores and/or is associated with the unique token identifier generated in step 306, the token secret generated in step 303, and/or the zero-knowledge proof data determined via step 304 and/or step 305. As part of minting the digital asset, the private blockchain devices 205 may charge a fee. In such a circumstance, whether as part of the create token transaction request or as part of a different series of communications, the issuer device 201 may be required to pay such a fee by, for example, paying a certain amount of cryptocurrency.

As part of minting the digital asset, the private blockchain devices 205 may disassociate the digital asset from the issuer. For privacy reasons, this approach may be desirable, as it ensures that the recipient of the digital asset is not linked to the issuer in the record of the private blockchain 206. For instance, the digital asset might be recorded in the private blockchain 206 in a manner that does not indicate the identity of the individual(s) that requested that the digital asset be created. As another example, one or more of the private blockchain devices 205 may store a digital asset in a private blockchain such that the private blockchain 206 stores an indication that the private blockchain 206 is entitled to the digital asset.

Moreover, the private blockchain 206 may be configured to not store information associated with the minting of the digital asset performed in step 308. For example, the private blockchain 206 may be configured to not store a record of a minting transaction associated with a digital asset. This may provide additional security, as doing so prevents analysis of the circumstances underlying the digital asset (which may, in turn, reveal a possible identity of the issuer).

The process described in step 308 may ultimately result in a digital asset, such as an NFT, being stored in a manner that indicates that the NFT is wholly unowned and exists on the private blockchain 206 without any particular association with any particular wallet address. This is a desirable result, as it helps obfuscate any connection(s) between the issuer and the recipient. In other words, and as will be detailed through the steps below, the recipient of the digital asset is able to retrieve the digital asset without ever revealing their association with the issuer.

In step 309, the issuer device 201 may send, to the recipient device 202, the unique token identifier. In this manner, the recipient may be provided the unique token identifier, which may correspond to the token secret generated in step 303. The recipient device 202 may, in turn, store the unique token identifier as associated with the token secret. The recipient is thereby provided an identification of the digital asset to which the token secret corresponds.

From step 310 through step 313, the sequence diagram depicted in FIG. 3 turns to a process whereby the recipient device 202 may, at some later time, receive the digital asset minted by the issuer device 201 and stored on the private blockchain 206. Such steps may be conducted long after the original minting of the digital asset. In fact, in some circumstances, it may be preferable for these steps to occur some time after step 308, as doing so helps further obfuscate any possible connections between the issuer and the recipient.

In step 310, the recipient device 202 may generate a zero-knowledge proof. The zero-knowledge proof may be generated based on the token secret. The zero-knowledge proof may be generated in the same manner (e.g., using the same function with which) the half of the zero-knowledge proof data was generated in step 304. In this manner, the recipient device 202 is able to prove that it possesses the token secret generated in step 303 without transmitting the token secret itself.

In step 311, the recipient device 202 may send, to the private blockchain devices 205, a token request. For example, one or more of the private blockchain devices 205 may receive, from the recipient, a token request that comprises a unique token identifier and a zero-knowledge proof that was generated, by the recipient, based on the token secret. As part of sending the token request, the recipient device 202 may connect to the private blockchain 206. The token request may comprise the unique token identifier received in step 309 and/or the zero-knowledge proof generated in step 310.

In step 312, the private blockchain devices 205 may verify the token request received in step 311. As part of verifying the token request, the private blockchain devices 205 may compare the zero-knowledge proof it received in step 311 against the zero-knowledge proof data it received as part of the create token transaction request in step 307. For example, the private blockchain devices 205 may query a database using the received unique token identifier received in step 311 to identify corresponding zero-knowledge proof data, then compare that zero-knowledge proof data to the candidate zero-knowledge proof received in step 311. In this manner, the private blockchain devices 205 may verify that the recipient knows a secret (that is, the secret reflected by the zero-knowledge proof) that is associated with a digital asset.

In step 313, the private blockchain devices 205 may send, to the recipient device 202, the digital asset, such as the minted NFT. For example, one or more of the private blockchain devices 205 may send, based on a comparison of the zero-knowledge proof to the zero-knowledge proof data, a digital asset, such as an NFT, to the recipient. Sending the digital asset may be responsive to the verification of the recipient in step 312. In other words, the private blockchain devices 205 may condition the sending of the digital asset upon determining that the zero-knowledge proof provided by the recipient corresponds to the zero-knowledge proof data that is associated with the digital asset.

The private blockchain devices 205 may delay transmission of the digital asset so as to further obfuscate the association between the issuer and the recipient. For example, the private blockchain devices 205 may send multiple digital assets to one or more recipients in rounds (e.g., once every ten minutes), such that the timing of the receipt of the token request cannot be readily correlated with the transmission of the corresponding digital asset. As another example, at least one of the private blockchain devices 205 may wait a predetermined time before sending a digital asset. This may be advantageous to, for example, prevent a malicious user from monitoring the timing of create token transaction requests, token requests, and digital asset transmissions to determine possible correlations.

The private blockchain devices 205 may shuffle identifiers of digital assets so as to further obfuscate the association between the issuer and the recipient. For example, one or more of the private blockchain devices 205 may associate a digital asset with a new token identifier, such that, when the digital asset is sent, the new token identifier is sent. As another example, a digital asset might be minted and associated with a first unique token identifier (e.g., "001231"), but the unique token identifier might be changed to a second unique token identifier (e.g., "first_token") before being transmitted as part of step 313. In this manner, even though a recipient might send a token request for a digital asset having a first unique token identifier, it might be provided the digital asset under an entirely different unique token identifier. This may be advantageous to, for example, prevent a malicious user from monitoring create token transaction requests and transmissions of digital assets to try to connect the sender and recipient of a digital asset. That said, because the unique token identifier for the digital asset would be changed after its creation by the issuer, the issuer would later need to identify the digital asset using its token secret, rather than its unique token identifier.

Step 314 and step 315 describe a process whereby information associated with the minted digital asset may be stored on the public blockchain 204 in a manner which allows for the verification of ownership of the digital asset without revealing any associations between the issuer and the recipient.

In step 314, the private blockchain devices 205 may batch a plurality of digital asset transactions. It may be desirable to reflect digital asset information on the public blockchain 204; however, it is nonetheless preferable to do so in a manner that still maintains the privacy between the sender and the recipient. One approach to doing so is to batch up digital asset transactions conducted on the private blockchain 206 in such a manner that reflects a plurality of real transactions in a hashed format, such that the hashes might be used to verify digital asset ownership without revealing the identity of the issuer of a digital asset. In other words, rather than storing individual information about digital assets every time they are minted on the private blockchain 206, it may instead be preferable to batch such transactions and store data for the batched transactions on the public blockchain 204 so as to further obfuscate any connections between one or more issuers and one or more recipients.

One way to obfuscate transactions conducted on the private blockchain 206 may comprise storing, on the public blockchain 204, data (e.g., hashes corresponding to different transactions) that may be tested (e.g., using the token secret, such as through zero-knowledge approaches) to confirm the transaction. In other words, rather than providing a list of digital assets or a listing of transactions conducted on the private blockchain 206, hashes of information about digital assets may be stored on the public blockchain 204. Those hashes may be tested by parties with sufficient information so as to verify the ownership of a particular digital asset. For example, if each hash is based on a digital asset identifier and a recipient wallet address, then an entity can verify that a recipient is entitled to a digital asset by generating a hash based on an identifier of that asset and the recipient's wallet address, then comparing the generated hash to one stored on the public blockchain 204.

As part of batching a plurality of digital asset transactions, the private blockchain devices 205 may generate synthetic digital asset transactions. Even the mere presence of data associated with transactions stored on the public blockchain 204 might be used to infer information about transactions.

To avoid malicious users being able to infer information from such hashes, the private blockchain devices 205 may mix real digital asset transaction information with synthetic digital asset transaction information, such that the existence of a hash does not necessarily imply a real transaction. To generate synthetic transactions, digital assets owned by no entity may be generated and stored on the private blockchain. Additionally and/or alternatively, past minting transactions may be processed to determine a pattern of minting activity, and synthetic minting transactions may be generated based on the pattern of minting activity.

Synthetic digital asset transactions may be generated through use of a trained machine learning model. A machine learning model may comprise a plurality of nodes that form an artificial neural network. The machine learning model may be trained using training data comprising a history of transactions conducted on the private blockchain 206. For example, the machine learning model may be provided untagged data indicating a plurality of minting transactions conducted on the private blockchain 206, including when digital assets were minted, the identifier(s) of those digital assets, and the like. The machine learning model may thereby be trained to output synthetic digital asset transactions, such as synthetic minting transactions. In turn, in response to input data (e.g., a timeframe), the trained machine learning model may output one or more synthetic digital asset transactions (e.g., one or more fake transactions that occurred during the timeframe, such as synthetic token identifiers, synthetic zero-knowledge data, and the like). This approach may be advantageous because it enables one or more of the private blockchain devices 205 to generate realistic and believable synthetic digital asset transactions, potentially throwing off any attempts at correlating issuer(s) and recipient(s).

In step 315, the private blockchain devices 205 may send, to the public blockchain devices 203, the batched data. For example, one or more of the private blockchain devices 205 may store, in a public blockchain different from a private blockchain, data corresponding to a plurality of digital asset transactions, and that data may comprise a hash based on an address associated with the recipient and the unique token identifier. The batched data may comprise a state change, such as to a smart contract. For example, a smart contract may be configured to store data reflecting a plurality of transactions at a first time, and the batched data may comprise a state change that, when provided to the smart contract, causes the smart contract to update to a second state that comprises a larger set of transactions (e.g., newer digital asset minting transactions).

In some ways, the batched data may be generated in a manner similar to how zero-knowledge rollups are performed. In other words, the batched data may comprise a set of a large variety of transactions conducted off-chain and may be usable only to prove validity on-chain (that is, on the public blockchain 204).

The batched data may comprise a Merkle tree. A Merkle tree may comprise a tree wherein every node (that is, every leaf of the tree) comprises a cryptographic hash of some form of data, and every node that is not a leaf (that is, every branch of the tree) comprises a hash of the labels of its child nodes. A Merkle tree is advantageous in that it permits additions of hashes in a chain-like fashion, such that the Merkle tree may be appended with later data (e.g., subsequent digital asset transactions) in a manner which shows the continuity of data. For example, one of the private blockchain devices 205 may store, as a Merkle tree, the plurality of NFT transactions, wherein at least one hash of the Merkle tree corresponds to the NFT. Such a Merkle tree may be configured such that all legitimate digital asset transactions may be verifiably complete on the public blockchain 204 by using, for example, zero-knowledge information derived from the token secret. The Merkle tree may be based on a previous state of a smart contract. In turn, the Merkle tree may be submitted as an update to an existing smart contract. For example, one of the private blockchain devices 205 may submit, to a smart contract on the public blockchain and based on the NFT, a state update. The Merkle tree may be associated with a validity proof of the transactions; however, the validity proof need not contain the actual transactions. As part of sending, to the public blockchain devices 203, the batched data, the issuer may pay fees by, for example, transmitting cryptocurrency.

As an example, the Merkle tree may comprise hashes that are each based on one or more previous hashes, the unique token identifier, and a recipient address. In this manner, each hash may be verified by an entity using a Merkle proof.

Digital asset metadata may additionally and/or alternatively be stored in the private blockchain 206 and verified via the private blockchain 206. In other words, in addition to and/or as an alternative to the smart contract comprising batched transactions described with respect to step 314 and step 315, digital asset information may be verified via the private blockchain 206. Such verification may be executed by either entity (e.g., the issuer and/or the recipient) providing a zero-knowledge proof based on the token secret to the private blockchain devices 205.

Given the above, there are at least three ways that the recipient of a digital asset might prove ownership of that digital assert. In some circumstances, an entity (e.g., the recipient) may query the private blockchain 206 for a digital asset having a particular unique token identifier, then compare the owner address to the recipient address. Additionally and/or alternatively, an entity (e.g., the recipient) may query the private blockchain 206 for a digital asset by providing the unique token identifier and a zero-knowledge proof based on the token secret, and the private blockchain 206 may confirm ownership with, for example, a Boolean response of whether the zero-knowledge proof is correct. Additionally and/or alternatively, digital asset ownership may be proven on the public blockchain 204 by hashing the unique token identifier and recipient address together into a first hash, then comparing that first hash with a Merkle proof to a smart contract on the public blockchain 204 maintaining the Merkle tree described above with respect to step 314 and step 315. That smart contract may then validate whether the Merkle proof is satisfied against the current state of the Merkle tree.

As a result of the entitlement to a digital asset, a recipient may move a digital asset to the public blockchain 204. In such a circumstance, one or more of the devices depicted in FIG. 2 may operate to move a digital asset from the private blockchain 206 to the public blockchain 204 upon confirmation that a recipient is entitled to such a digital asset and wants to move the digital asset to the public blockchain 204. For example, one of the private blockchain devices 205 may receive, from the recipient, a request to move the NFT to the public blockchain. In response, the one of the private blockchain devices 205 may, based on the request to move the NFT, and based on determining that the recipient is entitled to the NFT, transmit data associated with the NFT to the public blockchain.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to protect a privacy of parties conducting Non-Fungible Token (NFT) transfers by conducting separate NFT transactions on a private blockchain separate from a public blockchain, the computing device comprising:
   one or more processors; and
   memory storing instructions that, when executed by the one or more processors, cause the computing device to:
      receive, from an issuer, a create token transaction request that comprises:
         a unique token identifier comprising a string randomly generated by the issuer,
         a token secret comprising a concatenation of:
            a first string, randomly generated by the issuer and encrypted by the issuer using a first public key, and
            a second string, randomly generated a recipient and encrypted by the recipient using a second public key, wherein the first string and second string comprise a different length, and
         zero-knowledge proof data that was generated, by the issuer, based on the token secret;
      generate, based on the unique token identifier, the token secret, and the zero-knowledge proof data, and on the private blockchain, an NFT;
      receive, from the recipient, a token request that comprises:
         the unique token identifier, and
         a zero-knowledge proof that was generated, by the recipient, based on the token secret;
      send, based on a comparison of the zero-knowledge proof to the zero-knowledge proof data, the NFT to the recipient; and
      store, in the public blockchain different from the private blockchain, data corresponding to a plurality of NFT transactions, wherein the data comprises a hash based on:
         an address associated with the recipient, and
         the unique token identifier.

2. The computing device of claim 1, wherein the instructions, when executed, cause the computing device to send the NFT to the recipient by causing the computing device to:
   associate the NFT with a new token identifier, wherein sending the NFT to the recipient comprises sending, to the recipient, the new token identifier.

3. The computing device of claim 1, wherein the instructions, when executed, cause the computing device to store, in the private blockchain, an indication that the private blockchain is entitled to the NFT.

4. The computing device of claim 1, wherein the instructions, when executed, cause the computing device to send the NFT to the recipient by causing the computing device to:
   wait until a predetermined time before sending the NFT.

5. The computing device of claim 1, wherein the instructions, when executed, cause the computing device to store the data corresponding to the plurality of NFT transactions by causing the computing device to:
   store, as a merkle tree, the plurality of NFT transactions, wherein at least one hash of the merkle tree corresponds to the NFT.

6. The computing device of claim 1, wherein the instructions, when executed, cause the computing device to store the data corresponding to the plurality of NFT transactions by causing the computing device to:
   submit, to a smart contract on the public blockchain and based on the NFT, a state update.

7. The computing device of claim 1, wherein the instructions, when executed, cause the computing device to:
   receive, from the recipient, a request to move the NFT to the public blockchain; and
   based on the request to move the NFT, and based on determining that the recipient is entitled to the NFT, transmit data associated with the NFT to the public blockchain.

8. The computing device of claim 1, wherein the private blockchain does not store a record of a minting transaction associated with the NFT.

9. A method configured to protect a privacy of parties conducting digital asset transfers by conducting separate digital asset transactions on a private blockchain separate from a public blockchain, the method comprising:
   receiving, from an issuer, a create token transaction request that comprises:
      a unique token identifier comprising a string randomly generated by the issuer,
      a token secret comprising a concatenation of:
         a first string, randomly generated by the issuer and encrypted by the issuer using a first public key, and
         a second string, randomly generated by a recipient and encrypted by the recipient using a second public key, wherein the first string and second string comprise a different length; and
      zero-knowledge proof data that was generated, by the issuer, based on the token secret;
   generating, based on the unique token identifier, the token secret, and the zero-knowledge proof data, and on the private blockchain, a digital asset;
   receiving, from a recipient, a token request that comprises:
      the unique token identifier, and
      a zero-knowledge proof that was generated, by the recipient, based on the token secret;
   based on receiving the token request, associating the digital asset with a new token identifier;
   sending, based on a comparison of the zero-knowledge proof to the zero-knowledge proof data and to the recipient, the digital asset as associated with the new token identifier; and
   storing, in the public blockchain different from the private blockchain, an indication of the unique token identifier.

10. The method of claim 9, further comprising:
    storing, in the private blockchain, an indication that the private blockchain is entitled to the digital asset.

11. The method of claim 9, wherein sending the digital asset to the recipient comprises:
    waiting until a predetermined time before sending the digital asset.

12. The method of claim 9, wherein storing the indication of the unique token identifier comprises:
    storing, as a merkle tree, a plurality of digital asset transactions.

13. The method of claim 9, wherein storing the indication of the unique token identifier comprises:
    submitting, to a smart contract on the public blockchain and based on the digital asset, a state update.

14. The method of claim 9, further comprising:
    receiving, from the recipient, a request to move the digital asset to the public blockchain; and based on the request to move the digital asset, and based on determining that the recipient is entitled to the digital asset, transmitting data associated with the digital asset to the public blockchain.

15. The method of claim 9, wherein the private blockchain does not store a record of a minting transaction associated with the digital asset.

16. One or more non-transitory computer-readable media storing instructions configured to protect a privacy of parties conducting Non-Fungible Token (NFT) transfers by conducting separate NFT transactions on a private blockchain separate from a public blockchain, wherein the instructions, when executed, cause a computing device to:
receive, from an issuer, a create token transaction request that comprises:
a unique token identifier comprising a string randomly generated by the issuer,
a token secret comprising a concatenation of:
a first string, randomly generated by the issuer and encrypted by the issuer using a first public key, and
a second string, randomly generated by a recipient and encrypted by the recipient using a second public key, wherein the first string and second string comprise a different length;
zero-knowledge proof data that was generated, by the issuer, based on the token secret;
generate, based on the unique token identifier, the token secret, and the zero-knowledge proof data, and on the private blockchain, an NFT;
receive, from the recipient, a token request that comprises:
the unique token identifier, and
a zero-knowledge proof that was generated, by the recipient, based on the token secret;
based on receiving the token request, associate the NFT with a new token identifier;
send, based on a comparison of the zero-knowledge proof to the zero-knowledge proof data and to the recipient, the NFT as associated with the new token identifier;
store, in the public blockchain different from the private blockchain, data corresponding to a plurality of NFT transactions, wherein the data comprises a hash based on:
an address associated with the recipient, and
the unique token identifier;
receive, from the recipient, a request to move the NFT to the public blockchain; and
based on the request to move the NFT, and based on determining that the recipient is entitled to the NFT, transmit data associated with the NFT to the public blockchain.

17. The non-transitory computer-readable media of claim 16, wherein the instructions, when executed, cause the computing device to store the NFT in a private blockchain by causing the computing device to store, in the private blockchain, an indication that the private blockchain is entitled to the NFT.

18. The non-transitory computer-readable media of claim 16, wherein the instructions, when executed, cause the computing device to send the NFT to the recipient by causing the computing device to:
wait until a predetermined time before sending the NFT.

19. The non-transitory computer-readable media of claim 16, wherein the instructions, when executed, cause the computing device to store the data corresponding to the plurality of NFT transactions by causing the computing device to:
store, as a merkle tree, the plurality of NFT transactions, wherein at least one hash of the merkle tree corresponds to the NFT.

* * * * *